(12) United States Patent
Joglekar et al.

(10) Patent No.: US 7,454,667 B2
(45) Date of Patent: Nov. 18, 2008

(54) TECHNIQUES TO PROVIDE INFORMATION VALIDATION AND TRANSFER

(75) Inventors: Abhijeet Joglekar, San Jose, CA (US); Frank Berry, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 394 days.

(21) Appl. No.: 11/115,656

(22) Filed: Apr. 26, 2005

(65) Prior Publication Data

US 2006/0242532 A1 Oct. 26, 2006

(51) Int. Cl.
*H03M 13/09* (2006.01)
(52) U.S. Cl. .................................. 714/48; 714/807
(58) Field of Classification Search ............... 714/807, 714/48
See application file for complete search history.

(56) References Cited

U.S. PATENT DOCUMENTS

| | | | |
|---|---|---|---|
| 6,389,479 B1 * | 5/2002 | Boucher et al. | 709/243 |
| 6,711,621 B1 * | 3/2004 | Mitra et al. | 709/230 |
| 6,721,806 B2 * | 4/2004 | Boyd et al. | 719/312 |
| 6,779,056 B2 * | 8/2004 | O'Neill et al. | 710/52 |
| 6,804,804 B2 * | 10/2004 | Gahan et al. | 714/748 |
| 6,826,622 B2 * | 11/2004 | Maciel | 709/238 |
| 6,993,644 B2 * | 1/2006 | Anand et al. | 713/1 |
| 6,996,105 B1 * | 2/2006 | Wilson | 370/392 |
| 7,007,103 B2 * | 2/2006 | Pinkerton et al. | 709/238 |
| 7,010,469 B2 * | 3/2006 | Anderson et al. | 702/194 |
| 7,010,548 B2 * | 3/2006 | Jones et al. | 707/104.1 |
| 7,043,578 B2 * | 5/2006 | Hufferd | 710/105 |
| 7,191,240 B1 * | 3/2007 | Johnson | 709/230 |
| 2005/0044162 A1 | 2/2005 | Liang et al. | |

OTHER PUBLICATIONS

Storage Networking Industry Association, iSCSI Management API, Version 1.1.1 Draft, 2004, pp. 7-14.
Cavanna, V, "iSCSI Digests 0 CRC or Checksum," IETF Standard-working-draft, Mar. 2, 2001, p. 1, vol. 1, ITEF.
WO PCT/US2006/015847, Written Opinion, Oct. 13, 2006.
PCT/US2006/015847, International Search Report, Oct. 13, 2006.
Sheinwald, J. et al. "Internet Protocol Small Computer System Interface (iSCSI) Cyclic Redundancy Check (CRC)/Checksum Considerations," IETF Standard, Sep. 2002, p. 1, ITEF.
Satran, J. et al, *Internet Small Computer Systems Interface (iSCSI)*, Network Working Group, RFC 3720, Apr. 2004, cover page and sections 3.2.8, 3.5, 10.2.3, 12.1, Appendix A and Appendix B.4 (pp. 1, 35-36, 42-48, 118-119, 188-190, 209-212 and 217-218).
PCT, International Preliminary Report on Patentability (Chapter I of the Patent Cooperation Treaty), Application No.: PCT/US2006/015847, mailed Nov. 8, 2007.

* cited by examiner

*Primary Examiner*—Stephen M. Baker
(74) *Attorney, Agent, or Firm*—Blakely, Sokoloff, Taylor & Zafman LLP

(57) ABSTRACT

Techniques to issue a single application programming interface (API) to request both data copy and CRC validation operations. In some embodiments, a receiver of the API may observe which logic (e.g., software or hardware and/or combinations of software and hardware) is available to execute instructions for data copy and CRC validation operations.

29 Claims, 8 Drawing Sheets

TECHNIQUES TO PROVIDE INFORMATION VALIDATION AND TRANSFER

FIELD

The subject matter disclosed herein relates to information validation and transfer techniques.

RELATED ART

Some computers that receive traffic from a network utilize the Internet Small Computer System Interface (iSCSI) protocol. Some implementations of iSCSI (e.g., those implemented in Linux® or Microsoft Windows®) request data transfer from a network buffer to the iSCSI destination buffer and then issue a request to validate cyclical redundancy checking (CRC) over data in the destination buffers. In some cases, a stack layer, such as a TCP/IP processing stack, requests a transfer of data from the network buffer to the destination buffer and separately, the iSCSI layer performs a CRC validation on the transferred data (or requests a validation CRC on the transferred data). A kernel sockets layer may be used to separate the iSCSI layer from the stack layer and communicatively link the iSCSI layer with the stack layer.

BRIEF DESCRIPTION OF THE DRAWINGS

Note that use of the same reference numbers in different figures indicates the same or like elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1A:
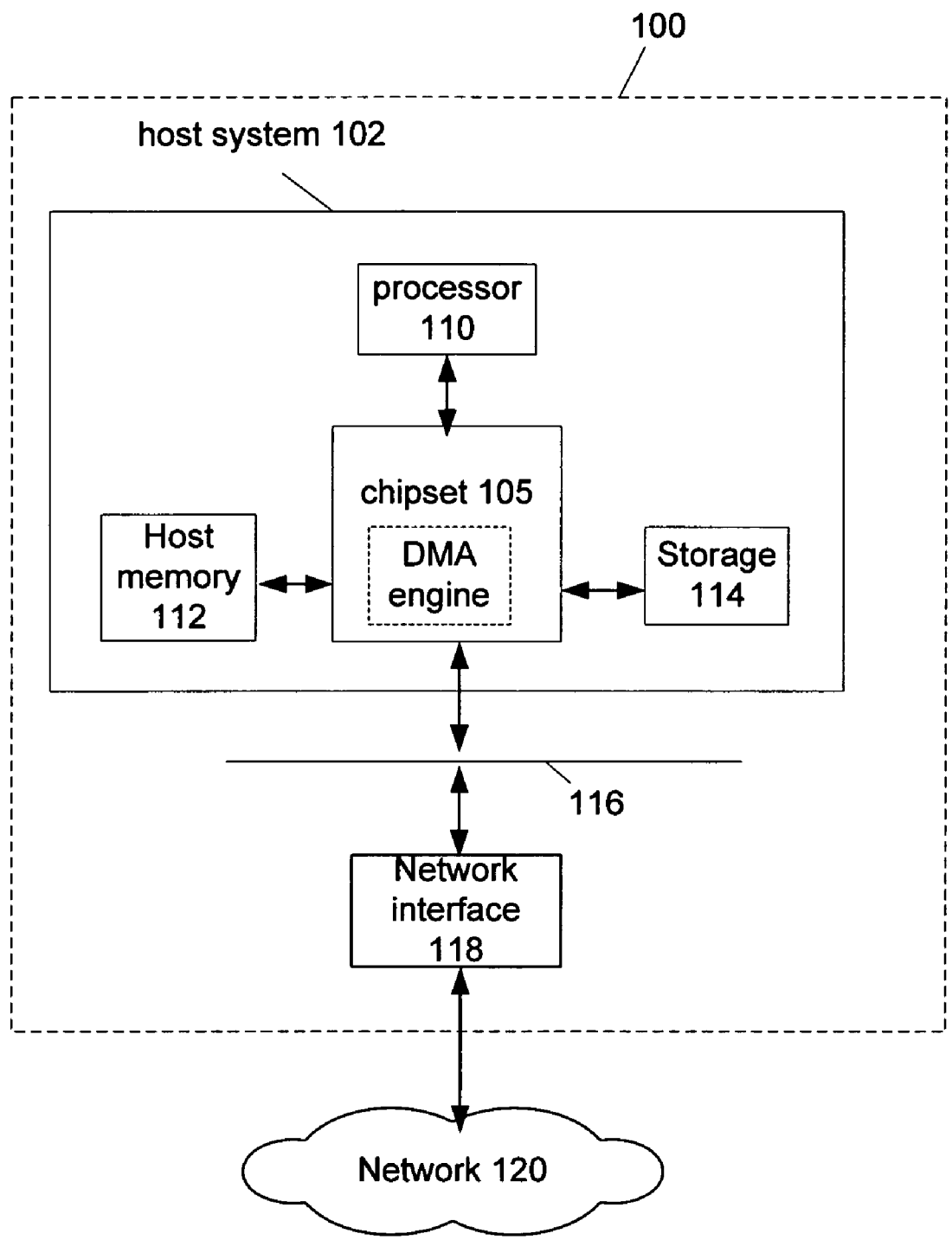
FIG. 1A depicts an example computer system capable to use embodiments of the present invention.

FIG. 1A depicts in computer system 100 a suitable system in which some embodiments of the present invention may be used. Computer system 100 may include host system 102, bus 116, and network interface 118.

Host system 102 may include chipset 105, processor 110, host memory 112, and storage 114. Chipset 105 may provide intercommunication among processor 110, host memory 112, storage 114, bus 116, as well as a graphics adapter that can be used for transmission of graphics and information for display on a display device (both not depicted). For example, chipset 105 may include a storage adapter (not depicted) capable of providing intercommunication with storage 114. For example, the storage adapter may be capable of communicating with storage 114 in conformance with any of the following protocols: Small Computer Systems Interface (SCSI), Fibre Channel (FC), and/or Serial Advanced Technology Attachment (S-ATA).

In some embodiments, chipset 105 may include a direct memory access (DMA) engine to perform direct memory accesses of information from and into host memory and/or host storage of host system.

Processor 110 may be implemented as Complex Instruction Set Computer (CISC) or Reduced Instruction Set Computer (RISC) processors, multi-core, or any other microprocessor or central processing unit.

Host memory 112 may be implemented as a volatile memory device such as but not limited to a Random Access Memory (RAM), Dynamic Random Access Memory (DRAM), or Static RAM (SRAM).

Storage 114 may be implemented as a non-volatile storage device such as but not limited to a magnetic disk drive, optical disk drive, tape drive, an internal storage device, an attached storage device, and/or a network accessible storage device.

Bus 116 may provide intercommunication among at least host system 102 and network interface 118 as well as other peripheral devices. Bus 116 may support serial or parallel communications. Bus 116 may support node-to-node or node-to-multi-node communications. Bus 116 may be compatible with Peripheral Component Interconnect (PCI) described for example at Peripheral Component Interconnect (PCI) Local Bus Specification, Revision 2.2, Dec. 18, 1998 available from the PCI Special Interest Group, Portland, Oreg., U.S.A. (as well as revisions thereof); PCI Express described in The PCI Express Base Specification of the PCI Special Interest Group, Revision 1.0a (as well as revisions thereof); PCI-x described in the PCI-X Specification Rev. 1.0a, Jul. 24, 2000, available from the aforesaid PCI Special Interest Group, Portland, Oreg., U.S.A. (as well as revisions thereof); and/or Universal Serial Bus (USB) (and related standards) as well as other interconnection standards.

Network interface 118 may be capable of providing intercommunication between host system 102 and network 120 in compliance with protocols supported by network 120. Network interface 118 may intercommunicate with host system 102 using bus 116. In one embodiment, network interface 118 may be integrated into chipset 105.

Network 120 may be any network such as the Internet, an intranet, a local area network (LAN), storage area network (SAN), a wide area network (WAN), or wireless network. Network 120 may exchange traffic with network interface 118 using the Ethernet standard (described in IEEE 802.3 and related standards) or any communications standard.

Figure 1B:
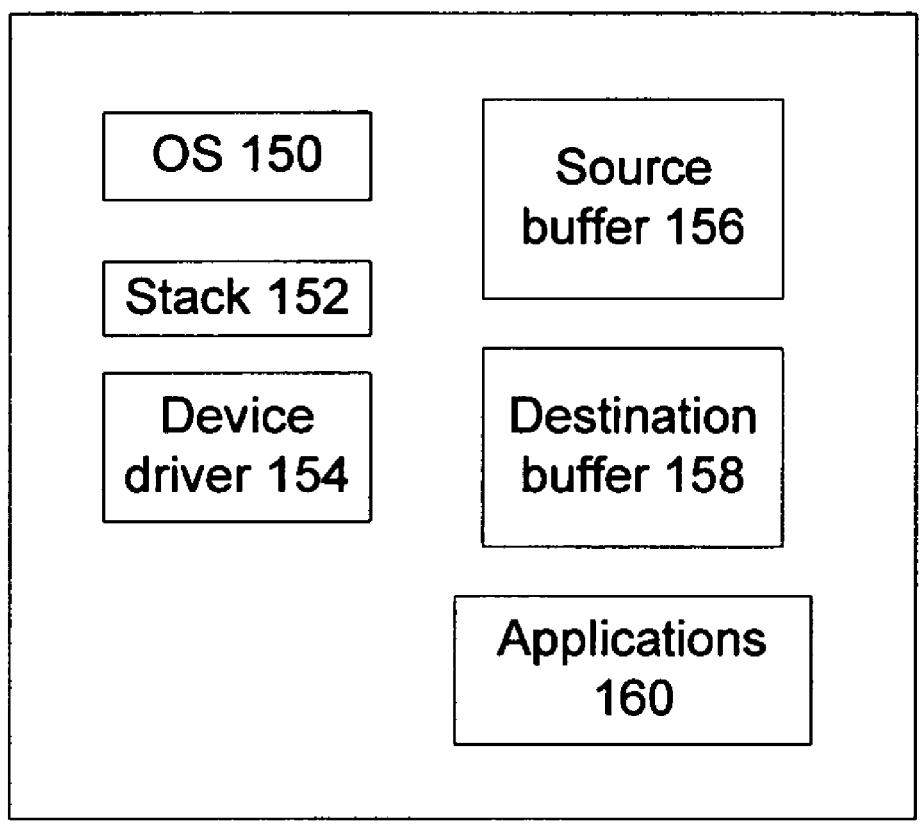
FIG. 1B depicts an example implementation of contents of a host memory that may be used in an embodiment of the present invention.

FIG. 1B depicts an example implementation of contents of a host memory that may be used in an embodiment of the present invention. For example, the host memory may store operating system (OS) 150, stack 152, device driver 154, source buffer 156, destination buffer 158, and applications 160.

Some embodiments of OS 150 may include at least an Internet Small Computer System Interface (iSCSI) stack capable of performing processing and encoding in accordance with iSCSI standards, a kernel sockets layer to provide communication at least of application programming interfaces (APIs) between the iSCSI stack and stack layer 152. For example, iSCSI is described at least in IP Storage Working Group Internet Draft RFC 3720 entitled "Internet Small Computer Systems Interface (iSCSI)" (April 2004). For example, suitable embodiments of OS 150 include, but are not limited to, operating systems compatible with Linux® or Microsoft Windows®.

Stack 152 may process packets to at least determine TCP/IP compliance in accordance with TCP/IP standards. For example, the TCP/IP protocol is described at least in the publication entitled "Transmission Control Protocol: DARPA Internet Program Protocol Specification," prepared for the Defense Advanced Projects Research Agency (RFC 793, published September 1981).

In some embodiments of the present invention, an iSCSI layer may provide a single application programming interface (API) request to stack 152 to request both data copy and CRC validation operations. The single API request may specify copy and CRC of multiple datum. For example, datum may include packets received from a network and/or other types of information. In some embodiments, stack 152 may observe which logic (e.g., software or hardware and/or combinations of software and hardware) is available to execute commands for data copy and CRC validation operations. The term "logic" may include, by way of example, software or hardware and/or combinations of software and hardware. In some embodiments, stack 152 may issue the requests for data copy and CRC validation operations based on the computing resources available in response to the single API request for both data copy and CRC validation operations. In some embodiments, a DMA engine is available for use at least for data transfers whereas in some embodiments, a CPU is used to copy data. For example, in some embodiments, a DMA engine can perform CRC validation operations whereas in some embodiments, instructions executed by a CPU are used to perform CRC validation operations. In some embodiments, a DMA engine may buffer data and perform CRC validation on the buffered data. The API may permit the iSCSI layer to be independent of the utilized operating system and platform and yet receive the most efficient performance of copy and CRC from the platform that is available.

In some embodiments, the kernel sockets layer of OS 150 may be at least modified to permit transfer of portions of the API request that requests combined data copy and CRC validation operations.

In some embodiments, stack 152 may be integrated into OS 150. In such embodiments, stack 152 may be modified to carry out an API requesting data copy and CRC validation operations. In such embodiments, stack 152 may be modified to permit the stack to observe what logic is available to carry out data copy and CRC validation operations.

Accordingly, although not necessary features of any embodiment, acceleration of operations specified in the iSCSI protocol may be provided while preserving the common operating system imposed boundaries between iSCSI and stack layer (i.e., the kernel sockets layer). Preserving the interface boundary may permit the stack to flexibly administer data copy and CRC validation operations below the interface boundary based on the logic available.

Device driver 154 may be a device driver for network interface 118. Device driver 154 may at least coordinate the transfer of data between host system and network interface.

Source buffer 156 may store data to be transferred to destination buffer 158. For example, source buffer 156 may store data received from a network. For example, under iSCSI, destination buffer 158 may implement a file system buffer.

Applications 160 can be one or more machine executable programs that may utilize data at least received from or transferred to a network. An application may include, but be limited to, for example, a web browser, input/output filter, an e-mail serving application, a file serving application, or a database application.

Figure 1C:
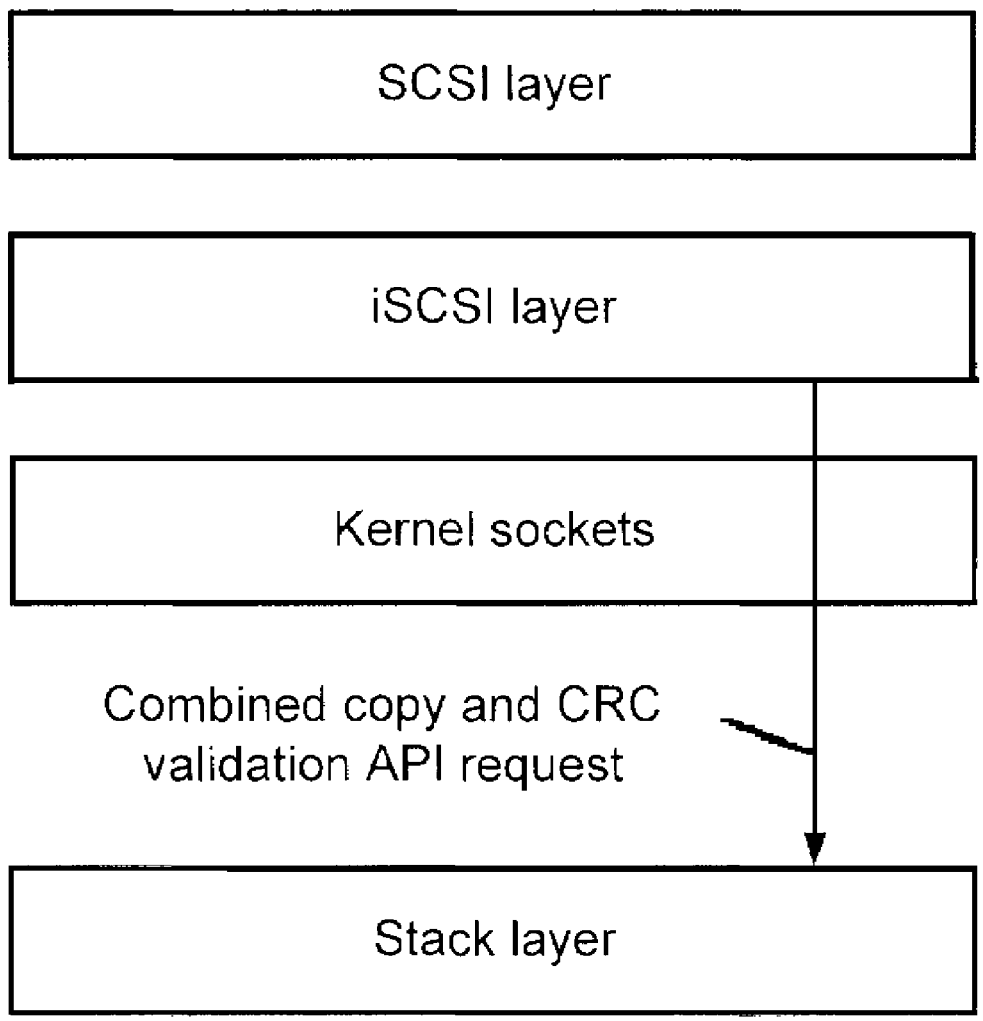
FIG. 1C depicts an example operation of an embodiment of the present invention that may provide data transfer and CRC validation operations in a single API request.

FIG. 1C depicts an example operation of an embodiment of the present invention to provide for data copy and CRC validation operations in a single application programming interface (API) request from an iSCSI layer to a stack layer. In some embodiments, a layer other than the iSCSI layer may issue the API request. In some embodiments, a layer other than the stack layer may receive the API request. For example the API call may have the following format:

getBufferListWithCRC (copy list, CRC list), where:

copy list represents an amount of data to copy and a destination scatter gather list of where data is to be copied; and CRC list represents a length of data over which a CRC is to be performed and a scatter gather list of where the data is located.

In some embodiments, no source address is specified in the copy and CRC list because source data is stored in sequential order, however the source address may be specified in other embodiments. In some embodiments, the contents of the copy list and CRC list may not be coextensive so that some items in the list may only be copied and others may only have a CRC validation performed. In some embodiments, a CRC validation can be performed over a portion of copied data.

In some embodiments, data may include markers (described at least by iSCSI) or other regions and CRC validation operations are not to be performed on the markers or other regions. For example, markers may be used to specify frame boundaries and can be used in case packets are lost or corrupted and to deliver data for use. The API may determine locations of markers by an offset to the first marker, the size of each marker, and interval between markers. For example, in one embodiment, if markers are present in the data to be copied, then a CRC is not performed over the markers. In some embodiments, if markers are not present in the data to be copied, then CRC list may be the same as the copy list.

Figure 2:
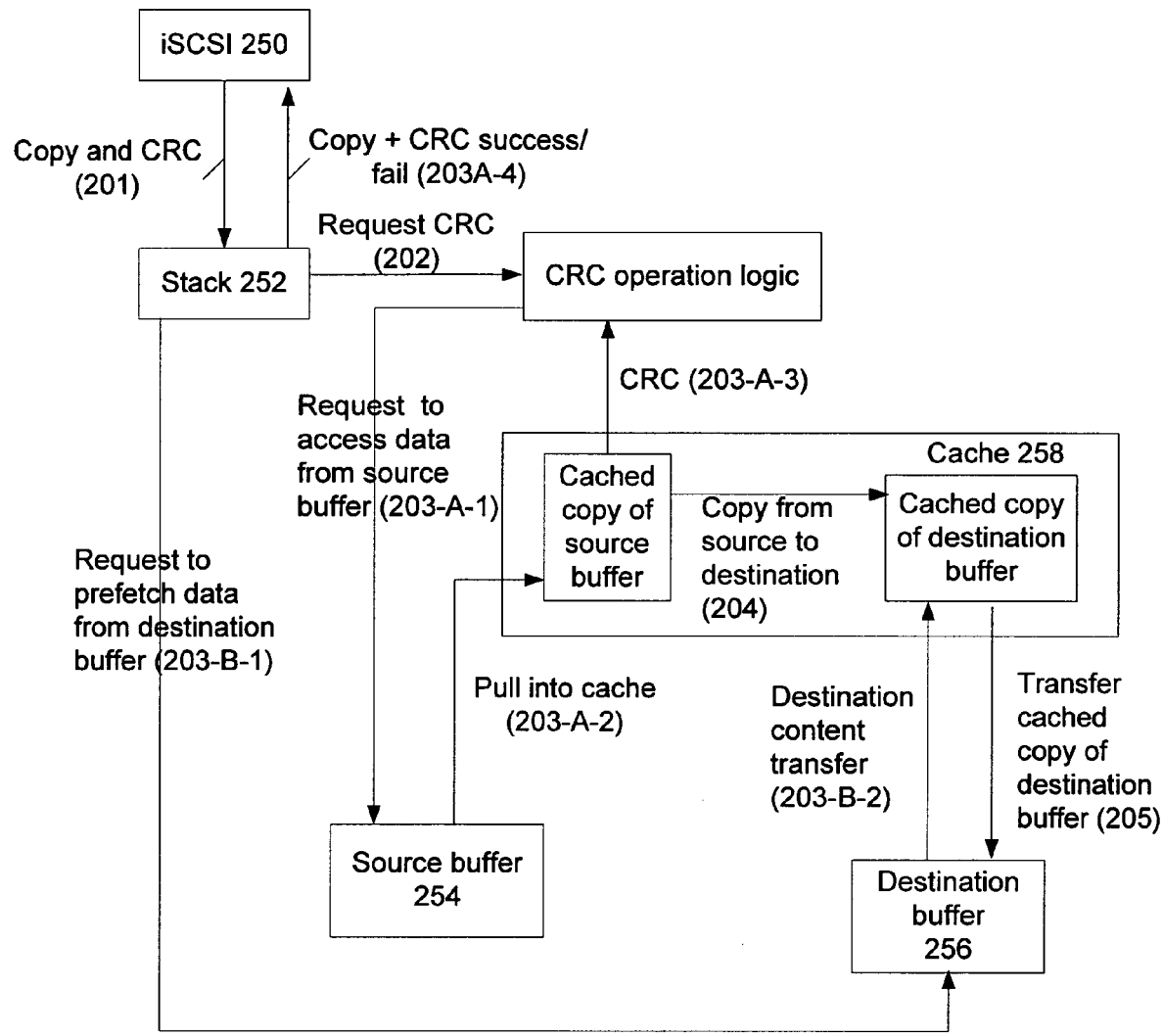
FIGS. 2-5 depict example operations of embodiments of the present invention that may provide for packet copying and CRC validation operations.

FIGS. 2-5 depict example operations of embodiments of the present invention that may provide for packet copying and CRC validation operations. Of course in FIGS. 2-5, other types of information may be copied and CRC validated. FIG. 2 depicts an example operation of an embodiment of the present invention that provides for data copying and CRC validation operations. In this example, computing resources available to a stack layer do not include availability of use of a DMA engine. Accordingly, the stack layer may respond to the copy and CRC validation API request by issuing an instruction to the CPU to perform a prefetch into a cache of a destination buffer memory space into which data is to be written into and an instruction to CRC validation logic to perform calculation of the CRC on the data that is to be transferred to the destination buffer memory space. Prefetching destination buffer contents in parallel with a CRC validation provides a speed advantage, but is not a necessary feature of any embodiment, by avoiding a time consuming transfer of contents from the destination buffer into the cache after a CRC validation.

In item 201, iSCSI layer 250 issues a combined copy and CRC API request to stack 252, in accordance with an embodiment of the present invention. The combined copy and CRC API request may specify copy and CRC of multiple packets. For example, the combined copy and CRC API may be implemented using the getBufferListWithCRC API. For example, the combined copy and CRC API request may specify that a copy and CRC validation of data in a source buffer is to take place.

In item 202, in part in response to the combined copy and CRC API request, stack 252 may request a CRC validation operation to CRC validation operation logic. The CRC validation operation is to take place on data stored in the source buffer and to be transferred to destination buffer 256 in item 204. For example, CRC validation operation logic may be integrated into stack 252 and accessible by issuing a function call. In other implementations, the CRC validation operation logic may be available as a separate element.

In item 203-A-1, in part in response to a CRC validation operation request from item 202, CRC validation operation logic may issue a request to access data from source buffer 254 on which to perform a CRC validation. For example, the data may be specified by the combined copy and CRC API request.

In item 203-A-2, in part in response to item 203-A-1, the requested data is transferred from source buffer 254 into cache 258 (shown as "cached copy of source buffer").

In item 203-A-3, a CRC validation operation is performed on the data stored in cache 258 (shown as cached copy of source buffer).

In item 203-B-1, stack 252 issues a request to prefetch data from the destination buffer 256 for storage into cache 258. The prefetched data may be a portion of destination buffer 256 to be overwritten by data to be transferred from source buffer 254 to destination buffer 256 in part in response to the combined copy and CRC API request. In item 203-B-2, in part in response to the request to prefetch data in item 203-B-1, cache 258 may retrieve requested data for prefetch from the destination buffer (the retrieved data shown as "cached copy of destination buffer").

In one embodiment, items 203-A-1 and 203-B-1 may overlap in time or occur at approximately the same time. In one embodiment, item 203-B-2 may overlap in time or occur at substantially the same time as item 203-A-2 and/or 203-A-3.

In item 204, the data of the cached copy of source buffer in cache 258 is transferred from the cached copy of source buffer into the cached copy of destination buffer. For example, the cached copy of source buffer is transferred to overwrite the cached copy of the destination buffer. In item 205, later in time, for example, whenever destination buffer is to be cleared from cache 258, cached copy of destination buffer is copied into destination buffer 256 to complete the data copy operation requested in combined copy and CRC API request from item 201.

In item 203-A-4, an indication of copy and CRC success/fail is provided to the iSCSI layer in part in response to completion of both copy (i.e., item 204) and CRC validation (i.e., item 203-A-3) operations. For example, the indication of copy and CRC success/fail may be provided to the iSCSI layer in response to completion of actions requested by the API request in item 201. For example, the indication of copy and CRC success/fail to the iSCSI layer may indicate a success when successful copy and CRC validations occurred for all packets identified in the API request issued in item 201 whereas a failure may be indicated when a failure occurred for any copy or CRC requested. The indication of failure may further indicate which operation (e.g., copy or CRC) failed and for what packet.

Figure 3:
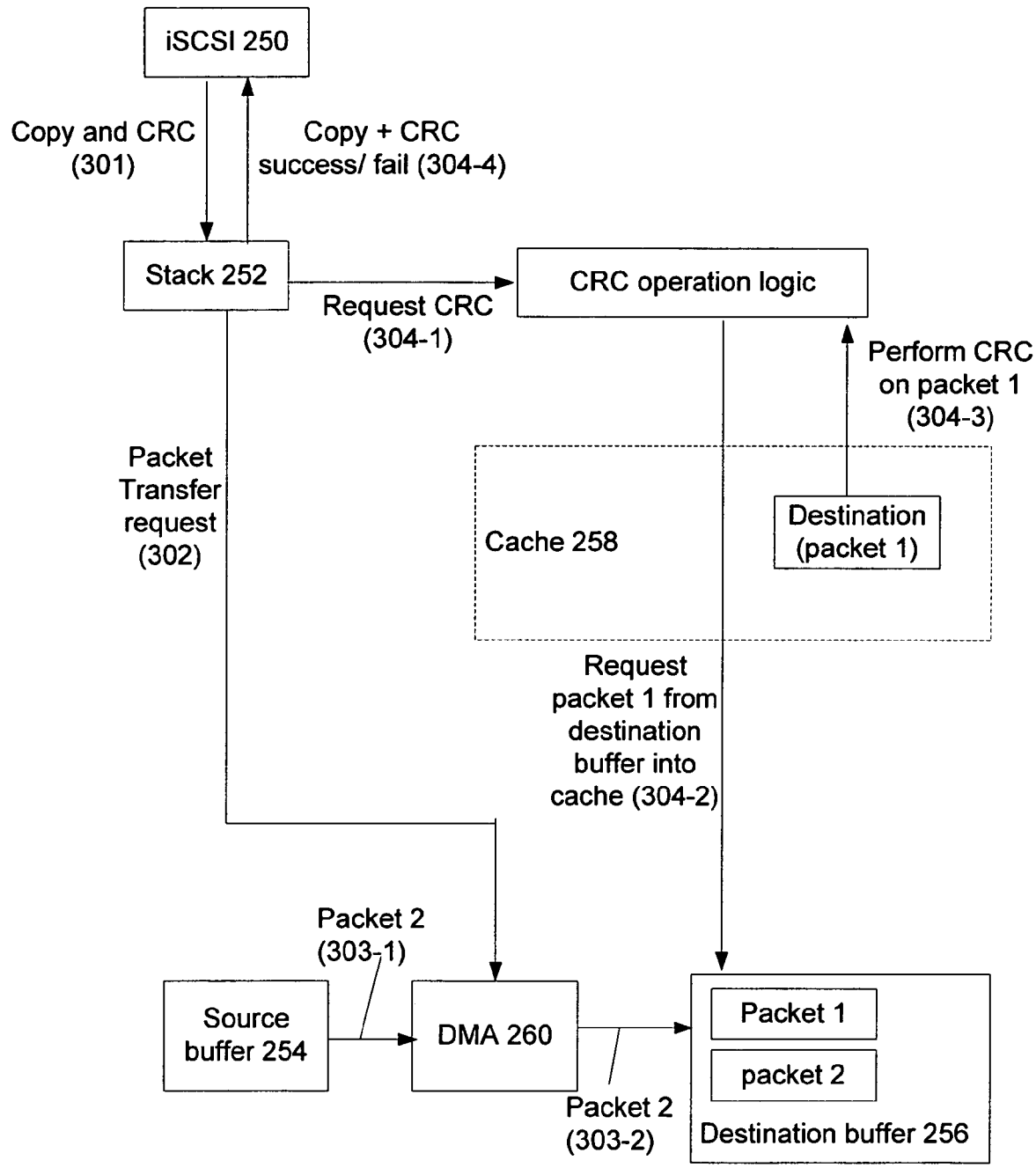

FIG. 3 depicts an example operation of an embodiment of the present invention that provides for data copying and CRC validation operations. In this example, computing resources available to a stack layer include availability of a DMA engine. Accordingly, the stack layer may respond to the copy and CRC validation request by issuing an instruction to the DMA engine to perform a transfer of data from source buffer 254 to destination buffer 256 and an instruction to perform calculation of the CRC on the transferred data to a separate CRC validation logic. Efficiencies in time may take place, but are not necessary features of any embodiment, by requesting the DMA engine to load data on which a CRC validation is scheduled to take place subsequently during at least a portion of performance of a CRC validation.

In item 301, iSCSI layer 250 issues a combined copy and CRC API request to stack 252 to request a copy and CRC validation of packets 1 and 2. In this example, packet 2 is scheduled to be copied and CRC validated after copy and CRC validation of packet 1. For example, the combined copy and CRC API may be implemented using the getBufferListWithCRC API. FIG. 3 does not depict transfer of packet 1 from source buffer 254 to destination buffer 256 using DMA engine 260. Transfer of packet 1 may have taken place in response to the API request issued in item 301.

In item 302, stack 252 issues a packet transfer request to DMA engine 260 to transfer packet 2 from source buffer 254 to destination buffer 256. In part in response to the request to transfer packet 2, in item 303-1, DMA engine 260 retrieves packet 2 from source buffer 254 and in item 303-2, DMA engine 260 stores packet 2 into destination buffer 256. For example, packet 2 may be a packet on which a data transfer and CRC validation is to take place after a CRC validation of packet 1.

In item 304-1, stack 252 requests a CRC validation operation on packet 1 stored in cache 258. For example, the CRC validation operation may be available to stack 252. In item 304-2, packet 1 stored in destination buffer 256 is transferred into cache 258 in part in response to a commencement of a CRC validation operation. For example, in item 304-2, the CPU that executes the CRC validation operation may request transfer of packet 1 into cache 258. In item 304-3, CRC validation of packet 1 may take place. CRC validation of packet 2 is not depicted. In item 304-4, stack 252 may provide an indication of copy and CRC success/fail to iSCSI layer in response to the completion of both copy and CRC validation operations for packets 1 and 2. For example, the indication of copy and CRC success/fail may be provided to the iSCSI layer in response to completion of actions requested by the API request in item 301. For example, the indication of copy and CRC success/fail to the iSCSI layer may indicate a success when successful copy and CRC validations occurred for packets 1 and 2 whereas a failure may be indicated when a failure occurred for any copy or CRC requested. The indication of failure may further indicate which operation (e.g., copy or CRC) failed and for what packet.

For example, the API request issued in item 301 could be extended to request copy and CRC of a packet 3 in addition to copy and CRC validation of packets 1 and 2. In such case, packet 3 may be transferred from source buffer 254 to destination buffer 256 by DMA engine 260 at least overlapping in time with CRC validation of packet 2.

Figure 4:
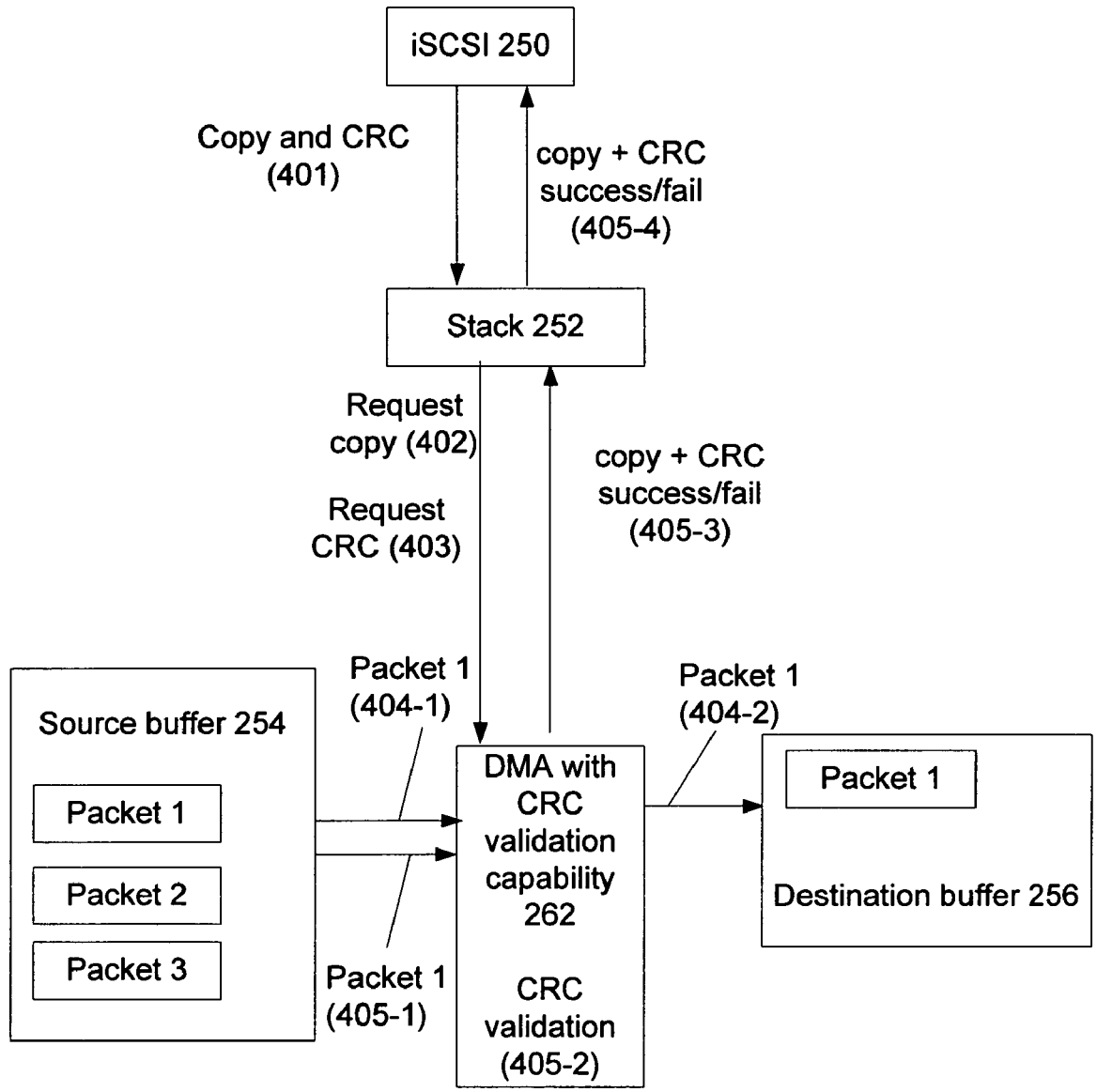

FIG. 4 depicts an example operation of an embodiment of the present invention to provide for data copying and CRC validation operations. In this example, computing resources available to a stack layer includes a DMA engine with the capability to transfer data as well as perform CRC validation operations (shown as DMA with CRC validation capability 262). Accordingly, the stack layer may respond to the copy and CRC validation request by issuing an instruction to the DMA engine to perform a transfer of data from a source buffer to a destination buffer and an instruction to the DMA engine to perform CRC validation on the data to be transferred.

In item 401, iSCSI layer 250 issues a combined copy and CRC API request to stack 252 to request a copy and CRC validation, in accordance with an embodiment of the present invention. The combined copy and CRC API request may specify copy and CRC of multiple packets. For example, the combined copy and CRC API may be implemented using the getBufferListWithCRC API. For example, the combined copy and CRC API request may specify that a transfer and CRC validation of packet 1 is to take place. Packet 1 may be stored in source buffer 254.

In item 402, stack 252 may request a copy operation to DMA engine 262. For example, item 402 may include a CPU that executes stack 252 issuing a data transfer request to DMA engine 262. In item 403, stack 252 may request a CRC validation operation take place by DMA engine 262 of data requested to be transferred in item 402.

In item 404-1, in part in response to the request in item 402, DMA engine 262 may request transfer of packet 1 from source buffer 254 and in item 404-2, DMA engine 262 may request storage of packet 1 into destination buffer 256.

In item 405-1, in part in response to the request in item 403, DMA engine 262 may request packet 1 from source buffer 254. In item 405-2, in part in response to the request in item 403, DMA engine 262 may perform a CRC validation operation on packet 1. In item 405-3, DMA engine 262 may indicate copy and CRC success/fail to stack 252 in response to completion of copy and CRC operations. In item 405-4, stack 252 may indicate copy and CRC success/fail to iSCSI layer 250 in response to the indication of copy and CRC success/fail received by stack 252. For example, the indication of copy and CRC success/fail may be provided to the iSCSI layer in response to completion of actions requested by the API request in item 401. The indication of copy and CRC success/fail to the iSCSI layer may indicate a success when successful copy and CRC validations occurred for all packets identified in the API request issued in item 401 whereas a failure may be indicated when a failure occurred for any copy or CRC requested. The indication of failure may further indicate which operation (e.g., copy or CRC) failed and for which packet(s).

Figure 5:
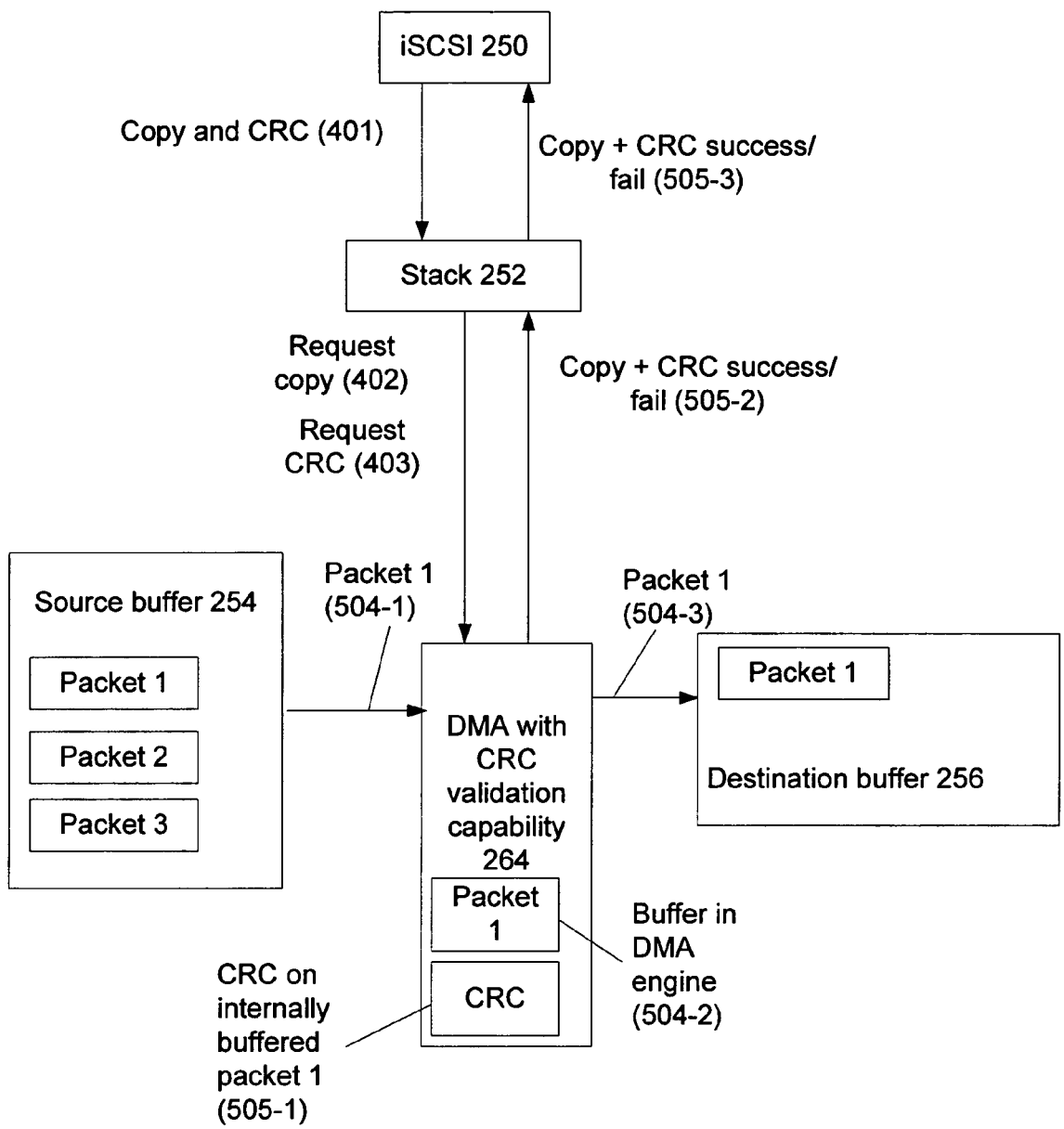

FIG. 5 depicts an example operation of an embodiment of the present invention to provide for copying and CRC validation operations. In this example, computing resources available to a stack layer include a DMA engine with the capability to transfer data as well as buffer data and perform CRC validation operations on buffered data (shown as DMA with CRC validation capability 264). Accordingly, the stack layer may respond to the copy and CRC validation request by issuing an instruction to the DMA engine to perform a transfer of data from a source buffer to a destination buffer and an instruction to the DMA engine to perform CRC validation on the data to be transferred.

Items 401-403 are described with respect to FIG. 4 except at least that items 402 and 403 are issued to DMA engine 264.

In item 504-1, in part in response to the request in item 402, DMA engine 264 requests transfer of packet 1 from source buffer 254. In item 504-2 DMA engine 264 stores packet 1 into a buffer accessible by DMA engine 264. In item 504-3, DMA engine 264 may transfer packet 1 into destination buffer 256 for storage. Items 504-1 and 504-3 may implement the requested copy operation.

In item 505-1, in part in response to the request in item 403, DMA engine 264 may perform a CRC validation on the buffered packet 1. Item 505-1 may implement the CRC operation. In item 505-2, DMA engine 264 may indicate copy and CRC success/fail to stack 252 in response to completion of copy and CRC operations. In item 505-3, stack 252 may indicate copy and CRC success/fail to iSCSI layer 250 in response to the indication of copy and CRC success/fail received by stack 252. For example, the indication of copy and CRC success/fail may be provided to the iSCSI layer in response to completion of actions requested by the API request in item 401. The indication of copy and CRC success/fail to the iSCSI layer may indicate a success when successful copy and CRC validations occurred for all packets identified in the API request issued in item 401 whereas a failure may be indicated when a failure occurred for any copy or CRC requested. The indication of failure may further indicate which operation (e.g., copy or CRC) failed and for which packet(s).

Figure 6:
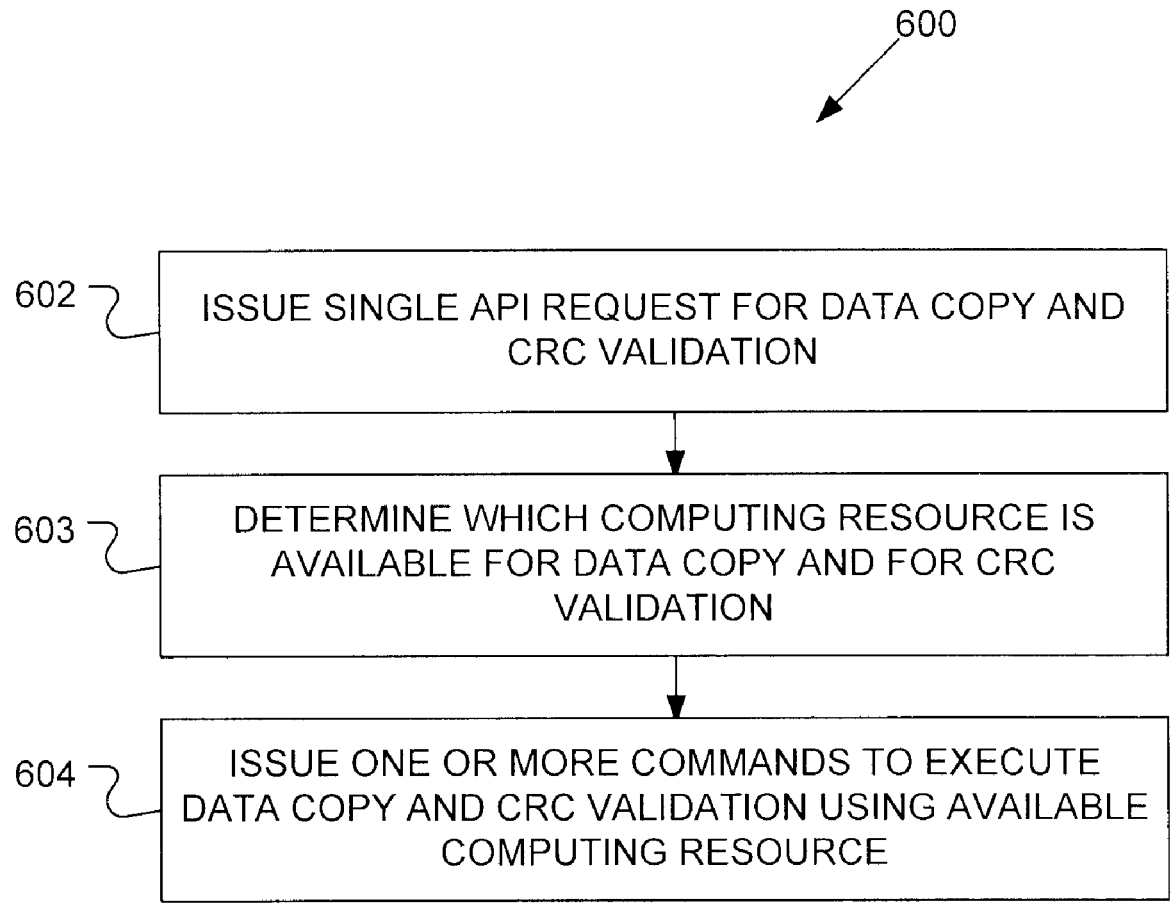
FIG. 6 depicts a suitable flow diagram of a process 600 in accordance with an embodiment of the present invention.

FIG. 6 depicts a suitable flow diagram of a process 600 in accordance with an embodiment of the present invention.

In block 602, process 600 may issue a single API request for data copy and CRC validation. For example, an iSCSI layer may issue the single API request for data transfer and CRC validation. The combined copy and CRC API request may specify copy and CRC of multiple datums. In block 603, process 600 may determine which computing resource is available for data copy and for CRC validation.

In block 604, process 600 may issue one or more commands to execute data copy and CRC validation based in part on the available computing environment. For example, a TCP stack layer may observe which device, software, or logic is available to execute commands for data transfer and CRC validation operations. In some embodiments, a DMA engine is available for use at least for data transfers whereas in some embodiments a CPU is used to transfer data. For example, in some embodiments, a DMA engine can perform CRC validation operations whereas in some embodiments, instructions executed by a CPU are used to perform CRC validation operations. In some embodiment, a DMA engine may buffer data and perform CRC validation on the buffered data.

Embodiments of the present invention may be implemented as any or a combination of: microchips or integrated circuits interconnected using a motherboard, hardwired logic, software stored by a memory device and executed by a microprocessor, firmware, an application specific integrated circuit (ASIC), and/or a field programmable gate array (FPGA).

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
   issuing a combined Application Programming Interface (API) request, the combined API request having a data copy request and a cyclical redundancy checking (CRC) validation request, from a first protocol processing layer to a second protocol processing layer;

receiving the combined API request by the second protocol processing layer;

determining at least one computing resource available to the second protocol processing layer to perform the data copy request and to perform the CRC validation request; and issuing at least one instruction from the second protocol processing layer to the at least one computer resource to perform the combined API request.

2. The method of claim 1, wherein the first protocol processing layer comprises an Internet Small Computer System Interface compliant layer.

3. The method of claim 1, further comprising:

transferring the combined API request from the first protocol processing layer to the second protocol processing layer using an intermediate layer, wherein the intermediate layer comprises a kernel sockets layer.

4. The method of claim 1, wherein the second protocol processing layer comprises a Transmission Control Protocol compliant layer.

5. The method of claim 1, wherein the at least one computing resource available to the second protocol processing layer comprises at least one of a central processing unit, a cache, and a direct memory access engine capable to perform the data copy request, or to perform the CRC validation request or to perform the combined API request.

6. The method of claim 1, wherein the combined API request specifies the data copy and CRC validation for a plurality of datum.

7. The method of claim 1, wherein the combined API request comprises an instruction to transfer the data copy and perform CRC validation on at least a portion of the data copy.

8. The method of claim 7, wherein the combined API request comprises an instruction to transfer the data copy and perform CRC validation on another portion of data copy.

9. A computer-readable medium comprising instructions stored thereon which when executed by a machine cause the machine to:

issue a combined Application Programming Interface (API) request, the combined API request having a data copy request and a cyclical redundancy checking (CRC) validation request, from a first protocol processing layer to a second protocol processing layer;

receive the combined API request by the second protocol processing layer;

determine at least one computing resource available to the second protocol processing layer to perform the data copy request and to perform the CRC validation request; and issue at least one instruction from the second protocol processing layer to the at least one computer resource to perform the combined API request.

10. The computer-readable medium of claim 9, wherein the first protocol processing layer comprises an Internet Small Computer System Interface compliant layer.

11. The computer-readable medium of claim 9, is further to:

transfer the combined API request from the first protocol processing layer to the second protocol processing layer using an intermediate layer, wherein the intermediate layer comprises a kernel sockets layer.

12. The computer-readable medium of claim 9, wherein the second protocol processing layer comprises a Transmission Control Protocol compliant layer.

13. The computer-readable medium of claim 9, wherein the at least one computing resource available to the second protocol processing layer comprises at least one of a central processing unit, a cache, and a direct memory access engine capable to perform the data copy request, or to perform the CRC validation request or to perform the combined API request.

14. The computer-readable medium of claim 9, wherein the combined API request specifies data copy and CRC validation for a plurality of datum.

15. The computer-readable medium of claim 9, wherein the combined API request comprises an instruction to transfer the data copy and perform CRC validation on at least a portion of the data copy.

16. The computer-readable medium of claim 15, wherein the combined API request comprises an instruction to transfer the data copy and perform CRC validation on another portion of data copy.

17. An apparatus comprising:

first protocol processing layer logic to issue a combined Application Programming Interface (API) request, the combined API request having a data copy request and a cyclical redundancy checking (CRC) validation request, to a second protocol processing layer logic; and second protocol processing layer logic to:

receive the combined API request;

determine at least one computing resource available to the second protocol processing layer to perform the data copy request and to perform the CRC validation request; and issue at least one instruction to the at least one computer resource to perform the combined API.

18. The apparatus of claim 17, wherein the first protocol processing layer logic comprises an Internet Small Computer System Interface compliant logic.

19. The apparatus of claim 17, wherein the first protocol processing layer logic is to transfer the combined API request to the second protocol processing layer logic using an intermediate layer, wherein the intermediate layer comprises a kernel sockets layer logic.

20. The apparatus of claim 17, wherein the second protocol processing layer logic comprises a Transmission Control Protocol compliant logic.

21. The apparatus of claim 17, wherein the at least one computing resource available to the second protocol processing layer logic comprises at least one of a central processing unit, a cache and a direct memory access engine capable to perform the data copy request, or to perform the CRC validation request or to perform the combined API request.

22. The apparatus of claim 17, wherein the combined API request comprises an instruction to transfer the data copy and perform CRC validation on at least a portion of the data copy.

23. The apparatus of claim 17, wherein the combined API request comprises an instruction to transfer the data copy and perform CRC validation on another portion of data copy.

24. The apparatus of claim 17, wherein the combined API request specifies data copy and CRC validation for a plurality of datum.

25. A system comprising:

a host system comprising a processor and a memory device;

a bus; and a chipset to communicatively couple the host system to the bus, wherein the chipset comprises a network interface and wherein the host system comprises:

a first protocol processing layer logic to issue a combined Application Programming Interface (API) request, the combined API request having a data copy request and a cyclical redundancy checking (CRC) validation request, to a second protocol processing layer logic; and the second protocol processing layer logic to:
  receive the combined API request;
  determine at least one computing resource available to the second protocol processing layer to perform the data copy request and to perform the CRC validation request; and
  issue at least one instruction to the at least one computer resource to perform combined API request.

26. The system of claim 25, wherein the combined API request specifies data copy and CRC validation for a plurality of datum.

27. The system of claim 25, wherein the combined API request comprises an instruction to transfer the data copy and perform CRC validation on at least a portion of the data copy.

28. The system of claim 25, wherein the combined API request comprises an instruction to transfer the data copy and perform CRC validation on another portion of data copy.

29. The system of claim 25, wherein the first protocol processing layer logic is to transfer the combined API request to the second protocol processing layer logic using an intermediate layer, wherein the intermediate layer comprises a kernel sockets layer logic.

* * * * *